E. HILTON.
ENGINE.
APPLICATION FILED MAR. 11, 1920.
1,377,581.
Patented May 10, 1921.
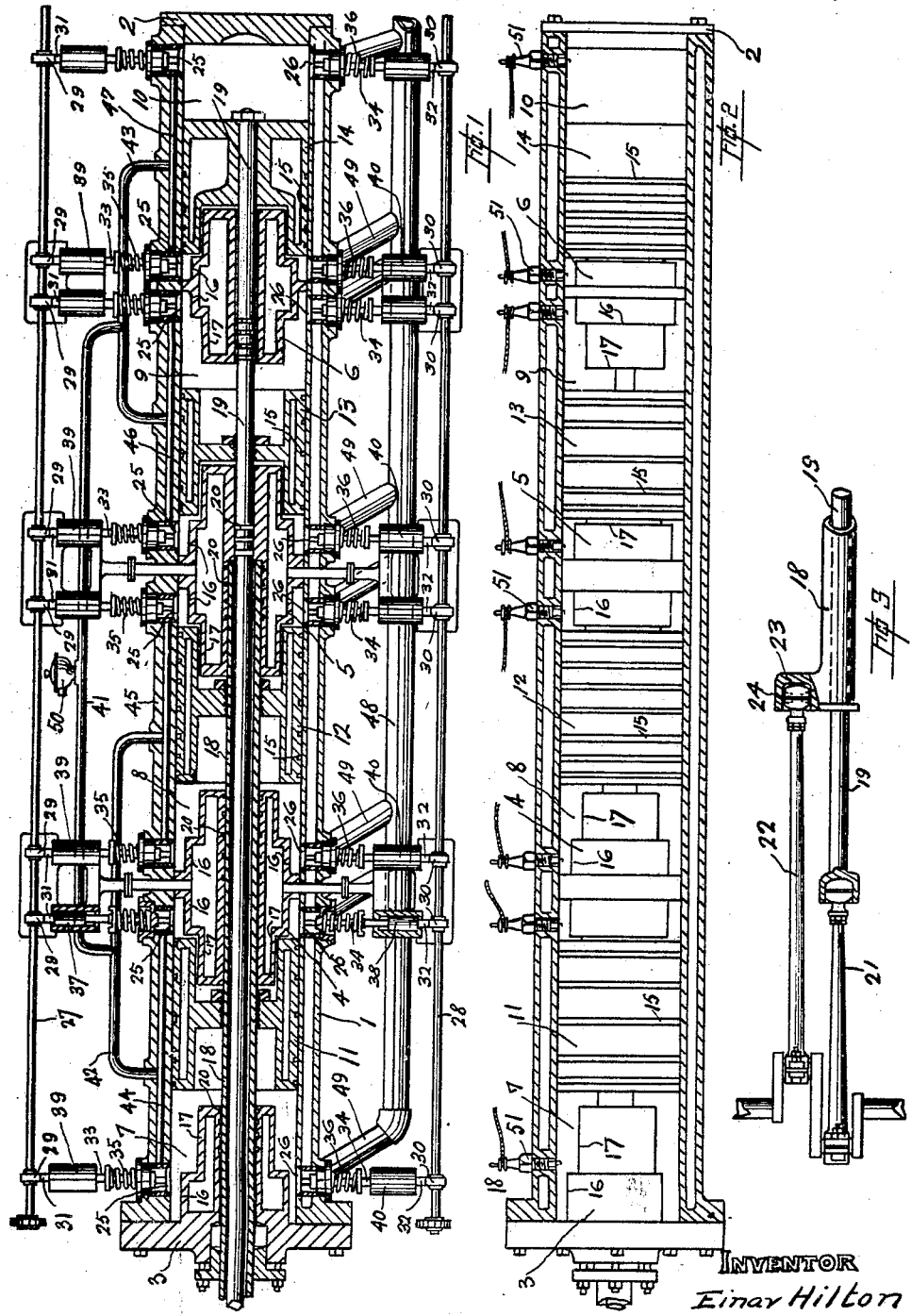
INVENTOR
Einar Hilton
BY
ATTYS.

UNITED STATES PATENT OFFICE.

EINAR HILTON, OF VANCOUVER, BRITISH COLUMBIA, CANADA.

ENGINE.

1,377,581. Specification of Letters Patent. Patented May 10, 1921.

Application filed March 11, 1920. Serial No. 364,932.

*To all whom it may concern:*

Be it known that I, EINAR HILTON, a subject of the King of Great Britain, and a resident of the city of Vancouver, in the Province of British Columbia, Canada, have invented certain new and useful Improvements in Engines, of which the following is a specification.

My invention relates to improvements in engines, with more particular reference to those of the internal combustion type, and the object of my invention is to devise an engine which is comparatively simple in construction, in which the parts are so arranged to enable a very compact machine to be provided capable of developing the maximum horse power, and which is evenly balanced so as to reduce vibration and undue wear to a minimum.

I attain this object by the construction illustrated in the accompanying drawings in which—

Figure 1 is a sectional elevation of the engine cylinder and valve mechanism.

Fig. 2 is a sectional view of the cylinder, the pistons being shown in full.

Fig. 3 is a view of the connecting rod arrangement.

Similar figures of reference indicate similar parts throughout the several views.

1 indicates the engine cylinder, which, it will be noted, is much longer than the usual type, and which is closed at its opposite ends by the cover 2 and front head 3 respectively. Within the cylinder and secured to it equidistant from each other are cylindrical heads 4, 5, and 6 which divide the main cylinder 1, as it were, into shorter cylinders 7, 8, 9 and 10, in which cylinders are mounted for reciprocation pistons 11, 12, 13, and 14, these pistons being provided with the usual piston rings 15, as shown. The heads 3, 4, 5, and 6 are reduced in diameter, as indicated by the numerals 16 and 17, the reductions 16 being for the purpose of providing admission space for the gas charges and reductions 17 being made to fit freely the bore of the respective pistons. The pistons 11, 12 and 13, are made double ended and piston 14, single ended, pistons 11 and 12 being mounted on a hollow piston rod 18 which extends slidably through the front head 3 and head 4 into head 5, while pistons 13 and 14 are mounted on a piston rod 19 which extends slidably through the bore of the piston rod 18 and the heads 5 and 6, as shown, these rods being provided with suitable packing rings, indicated by the numeral 20 to prevent leakage of gas past them. These piston rods 18 and 19 are connected to suitable connecting rods 21 and 22 which are in turn connected to the crank shaft and in order to provide clearance between the ends of the piston rods during operation of the engine connecting rod 22 is made longer than connecting rod 21, while clearance between the connecting rods themselves is provided for by forming the piston rod 18 with an offset end 23 which carries the wrist pin 24.

25 indicates the inlet, and 26 the exhaust, valves of the engine, there being an inlet and an exhaust valve at the opposite ends of each cylinder 7, 8, 9, and 10, from which it will be seen that gas charges may be admitted into, and exhausted from, the opposite ends of the cylinders, thus rendering them double-acting.

These valves, inlet and exhaust, are of the usual puppet type, the necessary valve seats being provided in the cylinder walls, as shown, and they are actuated at the proper moments by means of cam shafts 27 and 28 driven by any suitable means, such as, for instance, being gear connected to the crank shaft, the valve lifting cams 29 and 30 engaging the ends of tappets 31 and 32 which contact with the ends of the valve stems 33 and 34 in the well-known manner, springs 35 and 36 being provided for the reseating of the valves. The tappets 31 and 32 are fitted with pistons or plungers 37 and 38 operating in suitably mounted cylinders 39 and 40 whereby they are guided and steadied in their stroke.

41 indicates the main fuel supply pipe having branches 42 and 43 serving the inlet passages 44, 45, 46, and 47 serving the respective cylinders, while 48 indicates the main exhaust pipe with which the respective exhaust valves communicate through branches 49. 50 indicates the carbureter and 51 spark plugs for the opposite ends of each cylinder. The heads 3, 4, 5 and 6 are made hollow, as shown, to allow for their cooling by the circulation of water therethrough, while the cylinder walls are water-jacketed in any well approved manner and here it may be mentioned that the main cylinder 1 need not necessarily be cast in one piece, but may be formed in two or more parts rigidly bolted together when assembled.

The manner in which the engine operates may be briefly described. On referring to the drawings and particularly Fig. 1 it will be observed that pistons 11 and 12 are at the end of their in-stroke and pistons 13 and 14 are at the end of their out-stroke, the cranks then being positioned accordingly, as shown in Fig. 3. Prior to arriving at the ends of these respective in and out strokes a charge of gas was admitted in front of the respective pistons and compressed thereby so that on firing the compressed charges the pistons 11—12 and 13—14 will be driven forwardly and backwardly respectively to compress other charges admitted at the opposite ends of the cylinder which when fired will again drive pistons 11—12 and 13—14 backwardly and forwardly respectively and simultaneously, so that continued rotation of the cranks is thereby effected as long as gas charges are admitted to, compressed, and fired in, the respective cylinders. It will thus be seen that there are four pistons operating on the crank shaft but only one main cylinder, so that such an engine is extremely compact and comparatively light in weight, while at the same time it is powerful, well balanced, and operates with the minimum of vibration.

What I claim as my invention is:—

An engine comprising a main cylinder, outer cylinder heads closing the ends of said cylinder, inner cylinder heads spaced apart from one another and from said outer heads to define a plurality of smaller cylinders within said main cylinder, said inner cylinder heads being circumferentially reduced on opposite sides thereof to form stepped projections, cylinders slidable between said heads and pocketed to receive the smaller of said projections, the larger of said stepped projections of each head being arranged to define a compression space in conjunction with the surrounding wall of the main cylinder, a sleeve like piston rod extending through certain of said heads and connected to certain of said pistons, a second piston rod extending through said first-mentioned rod and through the remaining inner heads and connected to the remaining pistons.

Signed at Vancouver, B. C., Canada., this 28th day of February, 1920.

EINAR HILTON.